United States Patent
Baranowski et al.

(10) Patent No.: US 11,926,097 B2
(45) Date of Patent: Mar. 12, 2024

(54) METHOD FOR MANUFACTURING A COMPONENT BY FUSED FILAMENT FABRICATION AND APPARATUS FOR PRODUCING A COMPONENT

(71) Applicant: Ford Global Technologies, LLC, Dearborn, MI (US)

(72) Inventors: Thomas Baranowski, Würselen (DE); Maik Broda, Würselen (DE); Markus Franzen, Stolberg (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 17/317,934

(22) Filed: May 12, 2021

(65) Prior Publication Data

US 2021/0354384 A1 Nov. 18, 2021

(30) Foreign Application Priority Data

May 14, 2020 (DE) .......................... 102020206077.0

(51) Int. Cl.
*B29C 64/245* (2017.01)
*B29C 64/118* (2017.01)
(Continued)

(52) U.S. Cl.
CPC .......... *B29C 64/245* (2017.08); *B29C 64/118* (2017.08); *B33Y 10/00* (2014.12);
(Continued)

(58) Field of Classification Search
CPC ..... B29C 64/118; B29C 64/245; B33Y 10/00; B33Y 30/00
See application file for complete search history.

(56) References Cited

U.S. PATENT DOCUMENTS

| 2008/0136568 A1* | 6/2008 | Miyake | H01H 50/14 |
| | | | 335/202 |
| 2015/0108677 A1* | 4/2015 | Mark | B33Y 70/10 |
| | | | 425/375 |

(Continued)

FOREIGN PATENT DOCUMENTS

WO    2018015192    1/2018

*Primary Examiner* — Nahida Sultana
*Assistant Examiner* — Jamel M Nelson
(74) *Attorney, Agent, or Firm* — Burris Law, PLLC

(57) ABSTRACT

An additive manufacturing method for a component, the component being produced layerwise by fused filament fabrication, includes magnetizing a substrate plate, depositing at least one first layer on the substrate plate, this first layer including a first substance that contains magnetic material, depositing at least one further layer of a second substance, and demagnetizing the substrate plate. An apparatus for producing a component by fused filament fabrication includes a substrate plate for depositing layers of the component, wherein the substrate plate is magnetized before depositing a first layer on the substrate plate, the first layer including a first substance that contains magnetic material, and further layers including a second substance that does not contain a magnetic material are deposited on the first layer, and the substrate plate is demagnetized after forming the part.

11 Claims, 1 Drawing Sheet

Figure 1:
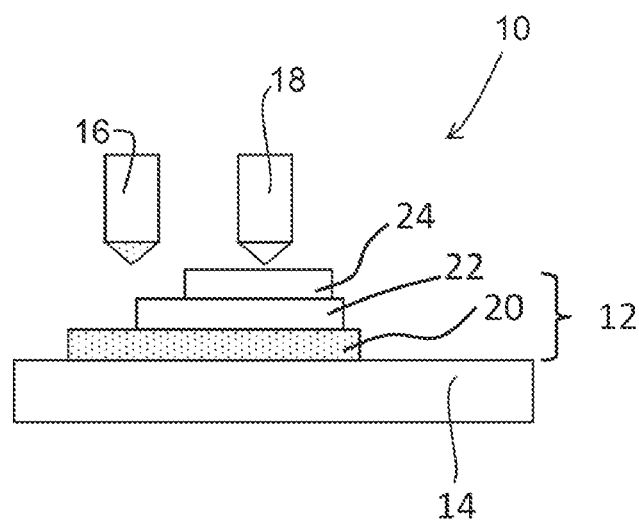

(51) Int. Cl.
*B33Y 10/00* (2015.01)
*B33Y 30/00* (2015.01)
*H01F 1/147* (2006.01)
*H01F 41/14* (2006.01)
*B29K 505/00* (2006.01)

(52) U.S. Cl.
CPC .............. *B33Y 30/00* (2014.12); *H01F 1/147* (2013.01); *H01F 41/14* (2013.01); *B29K 2505/00* (2013.01); *B29K 2995/0008* (2013.01)

(56) References Cited

U.S. PATENT DOCUMENTS

2015/0367576 A1    12/2015  Page
2017/0036403 A1*  2/2017  Ruff ........................ B33Y 40/00
2017/0050374 A1*  2/2017  Minardi ................. B33Y 10/00

* cited by examiner

METHOD FOR MANUFACTURING A COMPONENT BY FUSED FILAMENT FABRICATION AND APPARATUS FOR PRODUCING A COMPONENT

CROSS-REFERENCE TO RELATED APPLICATIONS

This application claims priority to and the benefit of German Patent Application No. DE102020206077.0, filed on May 14, 2020. The disclosure of the above application is incorporated herein by reference.

FIELD

The present disclosure relates to an additive manufacturing method for producing a component by fused filament fabrication and to an apparatus for producing a component by fused filament fabrication.

BACKGROUND

The statements in this section merely provide background information related to the present disclosure and may not constitute prior art.

Fused filament fabrication is a method from the field of 3D printing, the component being produced according to a 3D model from individual layers that are deposited successively on one another. During manufacture by means of fused filament fabrication, a meltable substance is initially melted. An extruder in the form of a heatable nozzle may for example be provided for this purpose, generally plastic threads (also filaments) referred to as being heated up to their melting temperature and above by means of the extruder. This melted material is deposited on a substrate plate by the extruder in accordance with the layers of the component. After one layer has been laid, the next layer of the molten material is applied. The component is thus formed layerwise.

One difficulty in the manufacture of a component by means of fused filament fabrication is that depending on the material used, the deposited layers, which often comprise a polymer substance, do not adhere well on the substrate plate on which at least the first, bottom layer is deposited.

International Publication No. WO 2018/015192 A1 discloses a 3D printing method wherein a first layer of the material is deposited on a substrate as an adhering layer. The material of this first adhering layer is intended to have a glass transition temperature that is lower than a glass transition temperature or melting temperature of a second layer. Furthermore, the substrate is intended to be at a temperature which lies between the glass transition temperature of the first layer and the glass transition temperature and/or melting temperature of the second layer. This is intended to achieve improved adhesion of the produced object on the substrate during the printing.

U.S. Publication No. 2015/0108677 A1 discloses a 3D printer which is configured to use already reinforced fibers or threads, which comprise a core that is surrounded by a matrix material, as printed material. To allow adhesion of the printed material on the substrate, a magnetic filler is intended to be introduced into the matrix material.

U.S. Publication No. 2017/0036403 A1 discloses a coated printing bed for a 3D printer, a permanent printing-surface coating being applied onto a substrate plate and an adherent interface layer being provided between a first layer of an applied plastic printing material and the coated printing bed.

U.S. Publication No. 2015/0367576 A1 discloses an automated system for producing composite parts. During the production of the composite parts, a first layer of the matrix material is initially applied onto a printing base. One or more further layers of a fiber are then applied onto the first layer. Optionally, a carrier material may be applied beforehand onto the printing support.

SUMMARY

This section provides a general summary of the disclosure and is not a comprehensive disclosure of its full scope or all of its features.

The present disclosure comprises a manufacturing method and an apparatus for producing a component, the method providing good adhesion of the component on a substrate plate during the printing process and easy separation of the component from the substrate plate after the completion of the printing process.

The present disclosure comprises an additive manufacturing method for a component, the component being produced layerwise. The component is produced by fused filament fabrication. The method comprises:
 a) magnetizing a substrate plate,
 b) depositing at least one first layer on the substrate plate, the first layer comprising a first substance that contains magnetic material,
 c) depositing at least one further layer of a second substance, and
 d) demagnetizing the substrate plate.

Method steps a) and b) may be carried out such that the magnetization of the substrate plate is carried out before the start of the deposition of the first layer, or is activated simultaneously with the deposition of the first layer. The demagnetization of the substrate plate in step d) may be carried out immediately after the completion of the at least one first layer or not until later, in particular simultaneously with step c) or even after step c), after the deposition of a last, top layer.

A "substrate plate" in the present disclosure refers to the support on which the layers are deposited. In the present disclosure, the substrate plate is magnetized. The substrate plate may be actively magnetized, i.e. the magnetic field may be switched on and off. In particular, the substrate plate is magnetized by an external magnetic field, for example by an electromagnet. The material of the substrate plate is, in particular, paramagnetic or ferromagnetic.

The at least one first layer deposited on the substrate plate comprises a first substance that contains magnetic material. The magnetic material may in particular be iron, nickel, cobalt, or alloys thereof, which are admixed to the first substance. Because of the magnetic material, the at least one first layer is magnetically attracted by the substrate plate when the magnetic field is activated, so that good adhesion of the first layer on the substrate plate is achieved. It may already be sufficient to deposit just one layer having magnetic material on the substrate plate, although a plurality of layers having magnetic material may also be deposited on one another.

When the deposition of the first layer, or of the plurality of first layers, having magnetic material is completed, at least one further layer of the second substance is subsequently deposited on the first layer, or on the first layers, of the first substance. This at least one further layer comprises, in particular, a substance that contains no magnetic material.

Because of the possibility of actively magnetizing and demagnetizing the substrate plate, the method according to the present disclosure provides not only good adhesion of the component being printed on the substrate plate during the printing process, but also easy removal of the component after completion of the printing process. A magnetic attraction force does not prevail after completion of the printing process, nor is the component provided with an adhesive that bonds the component strongly onto the substrate plate. Easy release of the component is desired for very delicate components, since they could otherwise break when being removed from the substrate plate.

As will also be explained in more detail below in connection with the apparatus, the magnetization in step a) is carried out by an electromagnet, and specifically by passing a current through a coil having a magnetizable core. Correspondingly, the magnetization may be switched on or off immediately by switching the current on or switching the current off. The magnetic field strength may easily be adjusted by the current strength, and thus adapted to the material of the first layer and to the thickness and the area of the first layer.

After the deposition of the heated and molten substance on the substrate plate, the substance recools and the deposited layers contract. This force occurring because of the cooling is counteracted by the magnetic force, which holds the bottom, first layer on the substrate plate. In order to counteract crack formation of the first layer, or of the first layers, the substrate plate may be heated in addition to the magnetization. The temperature then may be adjusted such that contraction of the first layer is counteracted but the layer does not melt or lose its geometrical stability.

In particular, the at least one further layer of the second substance contains no magnetic material. Only the first layer, or the plurality of first layers, of the first substance contain magnetic material, so that a sufficient attraction force is formed between the first layers and the substrate plate. The further layers may then be deposited without magnetic material on the first layer, or the first layers. Overall, costs can thereby be saved in relation to the preparation of the printing process and in relation to the finishing steps, and the component itself is nonmagnetic except for a few layers.

In one variation of the method according to the present disclosure, the first layer and/or the further layer comprise a polymer substance. Particularly, the first layer and the further layer may comprise a polymer substance, and in particular the first layer and the further layer consist of the same substance except for the magnetic material. For the first layer, magnetic material is merely added to the substance. As an alternative, the first substance having the magnetic material and the second substance (without magnetic material) may be different from one another. At the very least, the first substance and the second substance are correspondingly matched to one another such that they can form sufficient binding with one another, and in particular have a compatible surface tension.

In another variation of the method according to the present disclosure, the first layer is deposited on the substrate plate using a first printing head and the at least one further layer is deposited on the substrate plate using a second printing head. As used herein, a printing head refers to the extruder. The printing head is, in particular, displaceable over the substrate plate in the x, y, and z directions. The first printing head may have a filament of the first substance and the second printing head may have a filament of the second substance. Despite different substances, the method may be carried out smoothly since a different printing head is merely used and the filament material is not changed.

The present disclosure also comprises an apparatus for producing a workpiece by fused filament fabrication, the apparatus comprising a substrate plate for depositing the individual layers of the workpiece, and the substrate plate being magnetizable. As already described above, particularly good adhesion of the component during manufacture may thereby be achieved in combination with a component provided with magnetic material, release also being readily possible after switching off the magnetization.

In addition, the substrate plate may be heatable. This is intended to counteract possible contraction of the layers caused by the cooling of the layers after the deposition, so as to avoid crack formation taking place.

For the magnetization, the substrate plate comprises in particular an electromagnet, particularly in the form of a coil having an iron core. By passing a current through the coil, a magnetic field by which the component provided with magnetic material can be attracted is generated. Such a substrate plate having a coil and an iron core may be produced particularly easily and economically. In particular, with this design the magnetic field strength may be matched easily to the substance and the geometry of the component, by varying the current strength.

Furthermore, the substrate plate may comprise a resistive heater in the form of a wire for heating. In this case as well, the temperature may be adjusted by adjusting the current strength.

In one variation of the apparatus according to the present disclosure, the apparatus comprises two printing heads for applying a first layer having magnetic material and a second layer which is different than the first layer.

Further areas of applicability will become apparent from the description provided herein. It should be understood that the description and specific examples are intended for purposes of illustration only and are not intended to limit the scope of the present disclosure.

DRAWINGS

Figure 2:
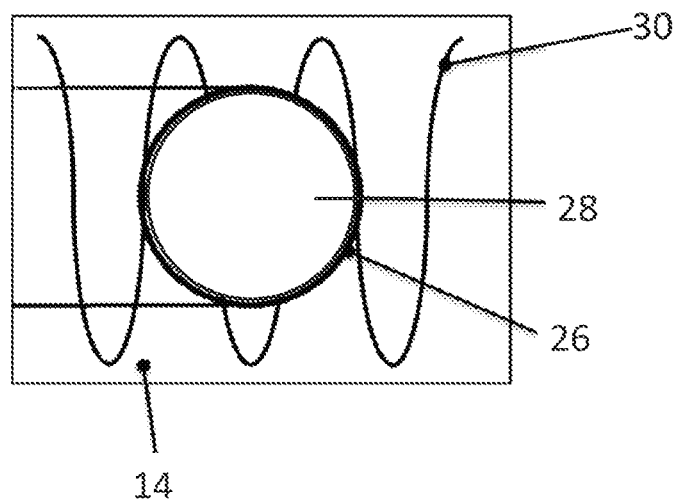

In order that the disclosure may be well understood, there will now be described various forms thereof, given by way of example, reference being made to the accompanying drawings, in which:

FIG. 1 illustrates a schematic side view of an apparatus according to one variation of the present disclosure; and FIG. 2 illustrates a schematic bottom view of a substrate plate according to one variation of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates an apparatus 10 for producing a component 12 by fused filament fabrication. The apparatus 10 comprises a substrate plate 14 and two printing heads 16, 18.

The component 12 is produced layerwise, and in this example comprises three layers 20, 22, 24. The bottom, first layer 20 comprises a first substance having magnetic material. In one form, the first substance is a polymer substance to which, for example, iron particles are added (indicated by dots). The further layers, for example the second and third layers 22, 24 as shown, comprise a second substance the second substance comprising a polymer substance having no magnetic material.

The first layer 20 of the first substance having the magnetic material is applied using the first printing head 16, and the further layers 22, 24 of the second substance are applied using the second printing head 18. The two printing heads 16, 18 can be moved in a known manner in the x, y, and z directions in order to generate the desired geometry of the individual layers 20, 22, 24, and ultimately the geometry of the component 12.

To achieve better adhesion of the deposited layers 20, 22, 24 on the substrate plate 14, the substrate plate 14 is magnetizable and heatable. One form of the substrate plate 14 is shown in detail in FIG. 2. To generate the magnetic field, the substrate plate 14 comprises an electromagnet in the form of a coil 26, which surrounds an iron core 28. A magnetic field is formed by passing a current. The substrate plate 14 furthermore comprises a resistive heater in the form of a wire 30 arranged in a sinuous line, by which the substrate plate 14 can be heated.

Before the first layer 20 having the magnetic material is then deposited by the first printing head 16, the magnetization is activated by passing a current through the coil 26. Furthermore, the substrate plate 14 is heated to a temperature which counteracts contraction of the first layer 20 after the deposition. The first layer 20 having the magnetic material, which has now been deposited, is then bound to the substrate plate 14 by the magnetic field. Subsequently, the further layers 22, 24 are deposited onto the first layer 20 by the second printing head 18. After the deposition of the top layer, i.e., layer 24, the current through the coil 26 and also through the wire 30 is switched off and the magnetization of the substrate plate 14 is deactivated, so that the component 12 can be removed easily from the substrate plate 14.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An additive manufacturing method for a component, the component being produced layerwise by fused filament fabrication, the method comprising:
    a) magnetizing a substrate plate;
    b) depositing at least one first layer of the component on the substrate plate by the fused filament fabrication, the at least one first layer comprising a first substance that contains magnetic material such that the at least one first layer is magnetically attracted by the substrate plate;
    c) depositing at least one further layer of the component onto the at least one first layer by the fused filament fabrication, the at least one further layer comprising a second substance; and
    d) demagnetizing the substrate plate.

2. The additive manufacturing method according to claim 1, wherein steps a) and b) are performed simultaneously.

3. The additive manufacturing method according to claim 1, wherein steps c) and d) are performed simultaneously.

4. The additive manufacturing method according to claim 1, wherein the magnetic material is chosen from the group consisting of iron, nickel, cobalt, and alloys thereof.

5. The additive manufacturing method according to claim 1, further comprising heating the substrate plate.

6. The additive manufacturing method according to claim 1, wherein the magnetization of the substrate plate is carried out by passing a current.

7. The additive manufacturing method according to claim 6, further comprising heating the substrate plate.

8. The additive manufacturing method according to claim 1, wherein the at least one further layer of the second substance comprises no magnetic material.

9. The additive manufacturing method according to claim 1, wherein the at least one first layer comprises a polymer substance.

10. The additive manufacturing method according to claim 1, wherein the at least one further layer comprises a polymer substance.

11. The additive manufacturing method according to claim 1, wherein the at least one first layer is deposited using a first printing head and the at least one further layer is deposited on the substrate plate using a second printing head.

* * * * *